United States Patent
Lehmann et al.

(10) Patent No.: US 7,211,182 B2
(45) Date of Patent: May 1, 2007

(54) PROCESS FOR PRODUCING COATINGS ON ELECTRICALLY CONDUCTIVE SUBSTRATES BY CATHODIC ELECTRODEPOSITION COATING

(75) Inventors: Horst Lehmann, Wuppertal (DE); Klausjoerg Klein, Wuppertal (DE); Rudolf Schipfer, Graz (AT)

(73) Assignee: E. I. du Pont de Nemours and Company, Wilmington, DE (US)

( * ) Notice: Subject to any disclaimer, the term of this patent is extended or adjusted under 35 U.S.C. 154(b) by 758 days.

(21) Appl. No.: 10/668,956

(22) Filed: Sep. 23, 2003

(65) Prior Publication Data
US 2005/0061677 A1    Mar. 24, 2005

(51) Int. Cl.
C25D 13/10    (2006.01)
C25D 13/12    (2006.01)

(52) U.S. Cl. ............ 204/486; 204/488; 204/500; 204/507

(58) Field of Classification Search ........... 204/500, 204/507, 486, 488
See application file for complete search history.

(56) References Cited

U.S. PATENT DOCUMENTS

| | | | |
|---|---|---|---|
| 4,652,353 A | 3/1987 | Honig et al. | |
| 4,655,787 A | 4/1987 | Renton | |
| 5,236,564 A | 8/1993 | Berg et al. | |
| 5,330,839 A | 7/1994 | Yasuoka et al. | |
| 5,554,700 A | 9/1996 | Schipfer et al. | |
| 5,670,441 A | 9/1997 | Foedde et al. | |
| 5,702,581 A | 12/1997 | Kerlin et al. | |
| 5,908,912 A | 6/1999 | Kollah et al. | |
| 5,936,013 A | 8/1999 | Feola et al. | |
| 5,972,189 A | 10/1999 | McMurdie et al. | |
| 6,174,422 B1 | 1/2001 | Hönig et al. | |
| 6,265,079 B1 | 7/2001 | Nishiguchi et al. | |
| 6,436,201 B1 | 8/2002 | Sugita et al. | |
| 6,541,120 B1 | 4/2003 | Klein et al. | |
| 2003/0082368 A1 | 5/2003 | Reuter et al. | |
| 2004/0089549 A1 | 5/2004 | David et al. | |

FOREIGN PATENT DOCUMENTS

| | | |
|---|---|---|
| DE | 4303787 C1 | 3/1994 |
| DE | 4303812 C1 | 5/1994 |
| DE | 4434593 A1 | 4/1996 |
| EP | 1 041 125 A1 | 4/2000 |
| GB | 2368302 A | 5/2002 |
| JP | 58-123900 A * | 7/1983 |
| WO | WO 96/10057 | 4/1996 |
| WO | WO 00/47642 | 8/2000 |
| WO | WO 01/40550 | 8/2000 |
| WO | WO 00/50522 | 6/2001 |
| WO | WO 01/51570 | 7/2001 |

OTHER PUBLICATIONS

The European Search Report Application No. EP 04020732, Mailed: Dec. 16, 2004.
Copending U.S. Appl. No. 10/650,410, filed Aug. 28, 2003.

* cited by examiner

*Primary Examiner*—Kishor Mayekar

(57) ABSTRACT

A process for the production of a CED (cathodic electrodeposition) coating with improved adhesion towards subsequent layers by cathodic electrodeposition of a coating layer of a CED coating composition onto an electrically conductive substrate and thermal curing by baking in an indirectly heated circulating air oven operated with a proportion of fresh air in the circulating air of the oven of 0 to 20 vol. %, wherein the CED coating composition used contains at least one water-soluble metal nitrate corresponding to a quantity of 1 to 10 mmol of nitrate per 100 g of resin solids content, wherein the metal is selected from the group consisting of metals of atomic numbers 20 to 83, with the exception of chromium, arsenic, rubidium, ruthenium, rhodium, palladium, cadmium, antimony, caesium, osmium, iridium, platinum, mercury, thallium and lead, and wherein at most 50 area-% of the CED-coated substrate surface are rinsed with water prior to thermal curing.

9 Claims, No Drawings

PROCESS FOR PRODUCING COATINGS ON ELECTRICALLY CONDUCTIVE SUBSTRATES BY CATHODIC ELECTRODEPOSITION COATING

FIELD OF THE INVENTION

The invention relates to a process for the production of coating layers on electrically conductive substrates by cathodic electrodeposition (CED) coating.

BACKGROUND OF THE INVENTION

CED coating is a well-known process for coating electrically conductive, in particular, metallic substrates, in particular, for the production of corrosion-protective primer layers on metallic substrates, such as, for example, automotive bodies.

In CED coating, the substrates are coated in a conventional CED coating bath (CED coating composition, CED coating agent, CED coating paint), and excess, inadequately adhering CED coating composition is then rinsed from the substrates back into the CED coating tank. To avoid an increase in the volume of the CED coating bath, the substrates are conventionally rinsed with ultrafiltrate obtained from the CED coating bath.

The ultrafiltrate is obtained by known methods and, in addition to water, contains, for example, low molecular constituents, neutralizing agents, solvents and dissolved salts from the CED coating bath.

Finally, the substrates can be rinsed with water.

After rinsing, the CED coating layers are thermally cured (cross-linked) by baking in large, directly or indirectly heated circulating air ovens. Directly heated circulating air ovens are heated by combustion of, for example, natural gas, the combustion waste gases entering the circulating air of the oven. In circulating air ovens indirectly heated by means of heat exchangers, no combustion waste gases enter the circulating air of the oven.

It has been observed in industrial practice that the adhesion of subsequent coating layers, in particular underbody sealant layers, applied onto baked CED coating layers is often inadequate if the CED precoating has been baked in indirectly heated circulating air ovens.

WO 01/40550 solves the problem of inadequate adhesion of subsequent coating layers by a process for the production of an electrodeposition coating layer with improved adhesion towards subsequent coating layers by electrodeposition of a coating layer of an electrodeposition coating composition onto an electrically conductive substrate and baking, wherein the electrodeposition coating composition used contains one or more water-insoluble organic nitrites and/or nitrates and baking proceeds in an indirectly heated circulating air oven.

Metal compounds, for example, specific metal salts, are used in CED coating compositions, in particular, as cross-linking catalysts and/or anti-corrosion additives. In particular, lead compounds, such as lead silicate, often also in combination with tin compounds, such as dibutyl tin oxide, have been used. More recently, lead-free CED coating compositions have become known. CED coating compositions containing bismuth compounds have acquired particular significance, as described, for example, in U.S. Pat. No. 5,936,013, U.S. Pat. No. 5,554,700, U.S. Pat. No. 5,908,912, U.S. Pat. No. 6,174,422, U.S. Pat. No. 5,670,441, WO 96/10057, U.S. Pat. No. 5,972,189, WO 00/50522, U.S. Pat. No. 6,265,079, EP 1 041 125, WO 00/47642, WO 01/51570, U.S. Pat. No. 5,702,581 and U.S. Pat. No. 5,330,839.

Surprisingly, the solution to the problem disclosed in WO 01/40550 can equally well be achieved if, instead of the water-insoluble organic nitrites and/or nitrates disclosed therein, certain water-soluble metal nitrates are used as an additive in CED coating compositions and if a minimum proportion of the area of the substrate surface coated with a CED coating layer from the CED coating compositions is not rinsed with water prior to thermal curing.

Nitrate in anionic form cannot be deposited on the cathode; it is in particular also consequently surprising that the same effect as described in WO 01/40550 can be achieved.

Advantages are achieved not only in terms of the simpler handling of water-soluble metal nitrates in comparison with the handling of the water-insoluble organic nitrites and/or nitrates, but also in that a metal required as a formulation constituent can also be introduced into the CED coating composition by means of a single chemical compound, namely, a metal nitrate.

SUMMARY OF THE INVENTION

The present invention provides a process for the production of a CED coating with improved adhesion towards subsequent layers by cathodic electrodeposition of a coating layer of a CED coating composition onto an electrically conductive substrate and thermal curing by baking in an indirectly heated circulating air oven operated with a proportion of fresh air in the circulating air of the oven of 0 to 20 vol. %, wherein the CED coating composition used contains at least one water-soluble metal nitrate corresponding to a quantity of 1 to 10 mmol of nitrate per 100 g of resin solids content, wherein the metal is selected from metals having atomic numbers 20 to 83, with the exception of chromium, arsenic, rubidium, ruthenium, rhodium, palladium, cadmium, antimony, caesium, osmium, iridium, platinum, mercury, thallium and lead, and wherein at most 50 area-% of the CED-coated substrate surface is rinsed with water prior to thermal curing.

The present invention also provides a process in which a subsequent layer, in particular a conventional underbody sealant layer, is applied onto the thermally cured CED coating layer produced according to the invention.

DETAILED DESCRIPTION OF THE EMBODIMENTS

The CED coating compositions according to the invention comprise known aqueous cathodically depositable electrodeposition coating agents. The CED coating compositions are aqueous coating compositions with a solids content of, for example, 10 to 30 wt. %. The solids content, in addition to the metal nitrate(s), consists of the resin solids content, optionally present pigments and/or fillers and further non-volatile additives. The resin solids are composed of conventional self- or externally cross-linking CED binder(s) having cationic substituents or substituents which can be converted to cationic groups; optionally, present are cross-linking agent(s) and optionally, present are other resin(s) contained in the CED coating agent, such as, paste resin(s). The cationic groups may be cationic groups or basic groups which can be converted to cationic groups, e.g., amino, ammonium, quaternary ammonium, phosphonium and/or sulfonium groups. Binders having basic groups are preferred. Nitrogen-containing basic groups, such as, amino groups are particularly preferred. These groups may be present in the quaternized form or they are converted to cationic groups with a conventional neutralizing agent, such as, amidosulfuric acid or methanesulfonic acid, lactic acid, formic acid, acetic acid.

The cationic or basic binders may be resins containing, for example, primary, secondary and/or tertiary amino groups, the amine values of which are, e.g., 20 to 250 mg KOH/g. The weight-average molecular mass (Mw) of the CED binders is preferably 300 to 10,000. There are no restrictions on the CED binders that can be used. The various CED binders or CED binder/cross-linking agent combinations known, for example, from the extensive patent literature may be used. Examples of such CED binders include amino(meth)acrylate resins, amino epoxy resins, amino epoxy resins with terminal double bonds, amino epoxy resins with primary OH groups, amino polyurethane resins, amino group-containing polybutadiene resins or modified epoxy resin/carbon dioxide/amine reaction products. As self-crosslinking or externally cross-linking binders, these CED binders have functional groups capable of crosslinking, in particular hydroxyl groups, for example, corresponding to a hydroxyl number of 30 to 300 mg KOH/g, preferably 50 to 250 mg KOH/g.

These binders may be self-crosslinking or they may be used in combination with cross-linking agents known to the skilled person. Examples of such cross-linking agents include aminoplast resins, blocked polyisocyanates, cross-linking agents with terminal double bonds, polyepoxide compounds, cross-linking agents with cyclic carbonate groups or cross-linking agents that contain groups capable of transesterification and/or transamidization. Preferred systems are those which self-crosslink or externally crosslink by reaction of groups comprising active hydrogen with blocked isocyanate groups, in particular those which crosslink by reaction of hydroxyl and/or primary and/or secondary amino groups with blocked isocyanate groups to form urethane and/or urea groups.

The CED binders may be converted to CED binder dispersions and used as such for the preparation of CED coating agents. The preparation of CED binder dispersions is known to the skilled person. For example, CED binder dispersions may be prepared by converting CED binders to an aqueous dispersion by neutralization with acid and dilution with water. The CED binders may also be present in mixture with cross-linking agents and converted together with these to an aqueous CED binder dispersion. If present, organic solvent(s) may be removed to the desired content before or after conversion to the aqueous dispersion, for example, by vacuum distillation.

The CED coating compositions used according to the invention contain at least one metal nitrate amounting to a proportion of 1 to 10 mmol, preferably 2 to 6 mmol, of nitrate per 100 g of resin solids content of the CED coating composition.

The metal nitrates are selected from among the water-soluble nitrates of metals from the group consisting of metals of atomic numbers 20 to 83, wherein chromium, arsenic, rubidium, ruthenium, rhodium, palladium, cadmium, antimony, caesium, osmium, iridium, platinum, mercury, thallium and lead are excepted. The term "metal nitrate" used in the present description and in the claims should not be understood exclusively to denote a simple metal nitrate salt comprising metal cations and nitrate anions, but also includes compounds such as, for example, metal oxynitrates or nitrate compounds with counter-cations containing the relevant metal. Preferred nitrates are those of titanium, vanadium, iron, zinc, yttrium, zirconium, tin, cerium, neodymium or bismuth, in particular of yttrium, neodymium or bismuth, especially of bismuth. Examples of bismuth nitrates are $Bi(NO_3)_3$ and $Bi_5O(OH)_9(NO_3)_4$.

As described in greater detail below, the metal nitrates may be added to the CED coating compositions in various manners, for example, from the outset during production of the CED coating compositions or subsequently, for example, immediately before or during use for cathodic electrodeposition coating.

It may be expedient if, in addition to the metal nitrate(s), the CED coating compositions also contain one or more further metal compounds other than the metal nitrate(s), for example, as additives serving to catalyse cross-linking and/ or to provide corrosion protection. In such metal compounds, the metals are present in an oxidation number of +2 or above and not as a constituent of anions. The further metal compounds other than the metal nitrates are preferably not lead compounds or compounds of other toxic metals such as, for example, chromium, arsenic, cadmium, antimony, mercury or thallium.

In the event that the CED coating compositions contain one or more further metal compounds other than the metal nitrate(s), they may comprise compounds of the same metal (s) present in the metal nitrate(s) or compounds of metals differing there-from. Preferred examples are compounds of vanadium, iron, zinc, yttrium, zirconium, tin, cerium, neodymium or bismuth, in particular of yttrium, neodymium or bismuth, especially of bismuth.

In particular, the further metal compounds other than the metal nitrate(s) may, for example, comprise corresponding metal complex compounds, for example, metal chelate complexes or preferably corresponding metal salts of an inorganic or organic acid, wherein the term "metal salt" includes not only salts consisting of appropriate doubly or multiply positively charged metal cations and acid anions, but also, for example, salts consisting of cations containing the metal and acid anions, and metalloxy salts. Examples of inorganic or organic acids from which the metal salts can be derived are inorganic or organic sulphonic acids, carboxylic acids, for example, formic acid or acetic acid, amino carboxylic acids and hydroxy carboxylic acids, such as lactic acid or dimethylolpropionic acid.

Preferred metal compounds are acetic acid salts, formic acid salts and hydrocarbyl sulphonic acid salts, such as alkylsulphonic acid salts of yttrium or neodymium and, in particular, acetic acid salts, methoxy acetic acid salts, aminocarboxylic acid salts or especially hydroxycarboxylic acid salts and sulphonic acid salts of bismuth. Preferred examples of the last bismuth salts are aliphatic hydroxycarboxylic acid salts of bismuth, such as lactic acid salts or dimethylolpropionic acid salts of bismuth, for example, bismuth lactate or bismuth dimethylolpropionate; amidosulphonic acid salts of bismuth; hydrocarbylsulphonic acid salts of bismuth, in particular alkyl sulphonic acid salts, especially methane sulphonic acid salts of bismuth, for example, bismuth methane sulphonate.

The total metal content arising from the contributions from metal nitrate and further metal compounds other than metal nitrate amounts, for example, to 0.1 to 2 wt. %, wherein the sum of the contributions calculated as metal is in each case relative to the resin solids content of the CED coating composition.

In addition to the binder(s), optionally present cross-linking agent(s), the metal nitrate(s) and water, the CED coating agents may also contain pigments, fillers, organic solvents and/or conventional coating additives.

Examples of pigments and fillers include the conventional inorganic and/or organic colored pigments and/or special-effect pigments and/or fillers such as, e.g., titanium dioxide, iron oxide pigments, carbon black, phthalocyanine pigments, quinacridone pigments, metallic pigments, interference pigments, kaolin, talc, silica. The pigment plus filler/resin solids weight ratio of the CED coating agents is, for example, from 0:1 to 0.8:1, and for pigmented coating agents it is preferably from 0.05:1 to 0.4:1.

Examples of organic solvents which may be used in the ready-to-apply CED coating bath in amounts of, for example, up to 5 wt. % include polar aprotic water-miscible solvents such as, N-methylpyrrolidone, dimethyl sulfoxide, dimethyl formamide, sulfolane; alcohols, such as, cyclohexanol, 2-ethylhexanol, butanol; glycol ethers, such as, methoxypropanol, ethoxypropanol, butoxyethanol, diethylene glycol diethyl ether; ketones, such as, methyl isobutyl ketone, methyl ethyl ketone, cyclohexanone; hydrocarbons.

Examples of conventional coating additives which may be used in the CED coating agents in amounts of, for example, up to 5 wt. %, based on the resin solids, include wetting agents, neutralizing agents, anti-crater agents, leveling agents, antifoaming agents, light stabilizers and antioxidants.

The CED coating compositions may be prepared in accordance with known processes for the production of CED coating baths, i.e. in principle both by means of the single-component method and by means of the two-component method.

The CED coating compositions may, for example, be produced in such a manner that the metal nitrate(s) is (are) mixed as such or as an aqueous solution with the other constituents of the CED coating compositions. The metal nitrate(s) may here be added to the CED coating compositions in various manners, for example, from the outset during production of the CED coating compositions or subsequently.

When producing the CED coating compositions by the single-component method it is, for example, possible to proceed by dispersing pigments and/or extenders in a proportion of the binder and/or cross-linking agent and then performing grinding in a suitable unit, for example, a bead mill, whereupon final formulation proceeds by mixing with the outstanding proportion of binder and/or cross-linking agent. The material obtained in this manner may then (unless already performed, after addition of neutralizing agent) be converted into the virtually ready CED coating composition by dilution with water, to which metal nitrate is yet to be added, in particular in the form of an aqueous solution.

When producing the CED coating compositions by the two-component method it is, for example, also possible to proceed by converting the cationic binders present in non-aqueous phase into the aqueous phase by dilution with water. Metal nitrate, in particular in the form of an aqueous solution, may then be added to the aqueous phase. The CED binder dispersion obtained in this manner may then be converted into a pigmented CED coating composition by mixing with a separate pigment paste. Alternatively, when using the two-component method, it is also possible to proceed by adding an aqueous pigment paste containing metal nitrate to a CED binder dispersion.

The metal nitrate(s) may also be added to the CED coating compositions separately, in particular in the form of an aqueous solution. It is, for example, also possible to carry out the separate addition subsequently to ready-to-apply CED coating baths.

According to the invention, CED coating layers are produced, for example to a dry film thickness of 10 to 30 μm, on electrically conductive, in particular, metallic substrates such as, for example, automotive bodies, from the CED coating compositions containing the metal nitrate(s).

After cathodic electrodeposition, the CED-coated substrate surface is rinsed generally at least in the area visible to the observer with ultrafiltrate obtained from the CED coating bath in a conventional manner known to the person skilled in the art in order to remove excess, not firmly adhering CED coating composition. This may proceed in the conventional manner by the dip and/or spray rinsing process, wherein the removed CED coating composition is returned to the CED coating tank in the conventional manner. Rinsing may then be performed with water, wherein, however, only at most 50 area-% of the CED-coated surface may be rinsed with water. Rinsing with water may here proceed on the CED-coated surface which has already been rinsed with ultrafiltrate and/or has not been rinsed. Complying with the limitation of rinsing with water to at most 50 area-% of the CED-coated surface is no problem in particular with three-dimensional substrates of a complicated geometry, such as, for example, automotive bodies, since internal surfaces, such as, for example, of cavities or surfaces located on the underside of the substrate, for example, of the automotive underbody, are not reached by the water used to spray down (shower down) the surfaces visible to the observer. In the case of automotive bodies, a sufficiently large proportion of the area can be excluded from rinsing with water simply on this basis.

After rinsing, the CED coating layer is thermally cross-linked by baking in indirectly heated circulating air ovens at object temperatures of, for example, 150 to 190° C. The phrase "indirectly heated circulating air ovens" means those circulating air ovens in which no combustion waste gases enter the circulating air of the oven and which are operated with no or only a small proportion of fresh air, as is the case for indirectly heated circulating air ovens operated in industrial practice. The proportion by volume of fresh air, relative to the circulated volume of air per unit time, is 0 to 20%, preferably no more than 10%. In the process according to the invention, there preferably prevails during baking, a ratio of oven volume to CED coating area to be baked of up to 2, for example of 0.2 to 2 cubic meters per square meter. The dimensions can be clarified by an example from automotive OEM coating: for example in an industrially operated circulating air oven with a volume of 1000 cubic meters, there are simultaneously present 25 vehicle bodies each comprising 80 square meters of CED coating layer to be baked, the circulating air throughput is 150,000 cubic meters per hour at a throughput of exhaust and fresh air of 12,000 cubic meters per hour in each case. In order to simulate the baking process in an industrially operated, indirectly heated circulating air oven, it is possible to use a laboratory circulating air oven, the fresh air proportion of which can be limited to up to 20%, preferably to below 10% and in which a ratio of 0.2 to 2 cubic meters of oven volume per square meter of CED coating layer to be baked is preferably maintained.

The process according to the invention is in particular suitable for the automotive sector, for example, for the production of a corrosion-protective CED primer layer on automotive bodies or body parts, which are then provided with further coating layers, in particular for example underbody sealant layers.

The underbody sealant layers conventional in automotive coating can be applied. These are, for example, coating compositions based on polyvinyl chloride (PVC) plastisols.

These are in particular applied onto the areas of automotive underbodies which are at risk of stone impact. Thick layers, for example of 0.5 to 3 mm, are generally applied.

Without providing a binding explanation, the theoretical assumption is that, at the air temperatures prevailing during baking of, for example, 180 to 220° C., any nitrate remaining on areas of the surface which have not been rinsed or have been rinsed only with ultrafiltrate but not with water decomposes to eliminate nitrogen oxides, hereinafter designated $NO_x$, and the $NO_x$ released into the circulating air of the oven brings about improved or adequate adhesion of subsequently applied coating layers.

The process according to the invention ensures good adhesion of subsequent coating layers, such as in particular underbody sealant layers, applied onto CED coating layers baked in indirectly heated circulating air ovens.

The following examples illustrate the invention. All parts and percentages are on a weight basis unless otherwise indicated.

EXAMPLES

Example 1

(Production of Bismuth Lactate):

901 parts by weight of 70% by weight aqueous lactic acid were introduced and heated to 70° C. 466 parts bismuth oxide ($Bi_2O_3$) were added batchwise while stirring. After stirring for an additional 6 hours at 70° C. the mixture was cooled to about 20° C. and left for 12 hours without stirring. Finally, the precipitate was filtered off, washed with a little water and ethanol and dried at a temperature of 40 to 60° C.

Example 2

(Preparation of a CED Dispersion)

a) 832 parts of the monocarbonate of an epoxy resin based on bisphenol A (commercial product Epikote® 828) were mixed with 830 parts of a commercial polycaprolactone polyol (commercial product CAPA 205) and 712 parts of diglycol dimethylether and reacted at 70° C. to 140° C. with 0.3% $BF_3$-etherate as catalyst until an epoxy value of 0 was obtained. In the presence of 0.3% Zn acetyl acetonate as catalyst, 307 parts of a reaction product of 174 parts of toluene diisocyanate and 137 parts of 2-ethyl hexanol were added to this product at 40° C. to 80° C. with the addition of 0.3% benzyl trimethylammonium hydroxide. The reaction was continued until an NCO (isocyanate) value of about 0 was obtained and the mixture then adjusted to a solids content of 70 wt. % with diglycol dimethyl ether.

b) 618 parts of a reaction product of 348 parts of toluene diisocyanate and 274 parts of 2-ethyl hexanol were added slowly to 1759 parts of a biscarbonate of an epoxy resin based on bisphenol A (commercial product Epikote® 1001) at 60° C. to 80° C. with the addition of 0.3% benzyl trimethylammonium hydroxide. The reaction was continued to an NCO value of about 0.

c) At a temperature of 20° C. to 40° C., 622 parts of the reaction product of 137 parts of 2-ethylhexanol with 174 parts of toluene diisocyanate with benzyltrimethylammonium hydroxide catalysis (0.3%) were added to 860 parts of bishexamethylene triamine dissolved in 2315 parts of methoxy propanol and the reaction was continued until an NCO content of about 0 was obtained. Then 4737 parts of the reaction product b) and 3246 parts of the reaction product a) (in each case 70% in diglycol dimethyl ether) were added and reacted at 60° C. to 90° C. The reaction was ended at an amine value of about 32 mg KOH/g. The product obtained was distilled under vacuum to a solids content of about 85%.

d1) Neutralization was carried out with 30 mmole of formic acid/100 g of resin. The mixture was then heated to 70° C. and bismuth lactate (from Example 1) was added in portions, with stirring, over a period of two hours, in an amount such that 0.7 wt. % of bismuth, based on resin solids content, were present in the mix. Stirring was then continued for another 6 hours at 60° C. After cooling, the mixture was converted with deionized water to a dispersion with a solids content of 40 wt. %.

Example 3

(Production of a Pigment Paste)

15 parts of acetic acid (50%), 30 parts of a conventional commercial wetting agent (50%), 100 parts of a 5 wt. % aqueous solution of $Bi(NO_3)_3$ and 250 parts of deionized water were added in a stirrer running at high speed to 223 parts of the paste resin according to EP-A-0 469 497 A1, Example 1 (55 wt. %). 12.3 parts of carbon black and 430 parts of titanium dioxide were added thereto. A solids content of 53 wt. % was established with deionized water and the mixture was ground in a bead mill. A stable pigment paste was obtained.

Example 4

(Production of a Pigment Paste)

Example 3 was repeated, but, instead of the 100 parts of the aqueous solution of $Bi(NO_3)_3$, 100 parts of an aqueous solution of bismuth lactate with the same bismuth content were used.

Example 5a (Production of a CED Coating, According to the Invention)

A CED coating bath with a solids content of 20 wt. % and a pigment/binder ratio by weight of 0.5:1 was produced in the conventional manner by mixing the CED dispersion from Example 2, deionized water and adding the pigment paste from Example 3 with thorough stirring. The CED coating bath contained 1 wt. % of bismuth, relative to resin solids content, and 4.3 mmol of nitrate per 100 g of resin solids content.

Once the CED coating bath had been adjusted with formic acid to an acid content of 35 milliequivalents/100 g of solids content, 10 panels (10 cm×20 cm in size) of conventional, phosphated bodywork steel were each coated therewith to a dry film thickness of 20 μm by cathodic electrodeposition, the panels were rinsed on both sides with ultrafiltrate obtained from the CED coating bath in order to remove excess, not firmly adhering CED coating bath material and were baked for 30 minutes at 160° C. (object temperature) in an electrically heated laboratory circulating air oven with a volume of 0.5 cubic meters (air temperature 220° C., fresh air proportion limited to less than 8%).

Example 5b (Production of a CED Coating, According to the Invention)

Example 5a was repeated, with the exception that one side of the sheet was additionally rinsed with water before baking.

Example 5c (Production of a CED Coating, Comparison)

Example 5a was repeated, with the exception that both sides were additionally rinsed with water before baking.

Example 6

(Production of a CED Coating, Comparison)

Example 5a was repeated, with the exception that the pigment paste from Example 4 was used instead of the pigment paste from Example 3. The CED coating bath contained 1 wt. % bismuth, relative to resin solids content.

Example 7

(Production of a CED Coating, Comparison)

Example 5a was repeated, with the exception that the laboratory circulating air oven was operated with the fresh air supply at maximum.

The CED-coated sheets obtained in Examples 5–7 were knife coated with a conventional commercial, PVC plastisol-based underbody sealant to a film thickness of 2 mm and baked for 20 minutes at 140° C. (object temperature) in order to gel the plastisol. Parallel scores at a spacing of 1.5 cm were made in the gelled plastisol layer. Using a knife, the gelled plastisol was carefully detached from the CED coating layer at the edge between two scores in order to create a tab to grip. The attempt was then made to pull the plastisol layer off manually. Adhesion was adequate only in Examples 5a and 5b, both according to the invention. In Comparative Examples 5c (100 area-% of the CED-coating layer rinsed with water prior to thermal curing), 6 (CED coating bath containing no nitrate) and 7 (huge proportion of fresh air in the circulating air of the oven), the gelled plastisol layer could be pulled off the CED-coated substrate.

What is claimed is:

1. A process for the production of a CED (cathodic electrodeposition) coating with improved adhesion towards subsequent layers comprising the steps of
   a) cathodically electrodepositing a CED coating layer of a CED coating composition onto an electrically conductive substrate surface and
   b) thermally curing the CED coating layer by baking in an indirectly heated circulating air oven operated with a proportion of fresh air in the circulating air of the oven of 0 to 20 vol. %,
   wherein the CED coating composition used contains at least one water-soluble metal nitrate corresponding to a quantity of 1 to 10 mmol of nitrate per 100 g of resin solids content, wherein the metal is selected from the group consisting of metals of atomic numbers 20 to 83, with the exception of chromium, arsenic, rubidium, ruthenium, rhodium, palladium, cadmium, antimony, caesium, osmium, iridium, platinum, mercury, thallium and lead, and wherein the CED coating layer substrate surface is rinsed with ultrafiltrate obtained from the CED coating composition at least in an area visible to an observer and subsequently at most 50 area-% of the CED coating layer substrate surface is rinsed with water prior to thermal curing.

2. The process of claim 1, wherein the metal nitrate is present in a proportion of 2 to 6 mmol of nitrate per 100 g of resin solids content of the CED coating composition.

3. The process of claim 1, wherein the at least one metal nitrate is selected from the group consisting of the nitrates of titanium, vanadium, iron, zinc, yttrium, zirconium, tin, cerium, neodymium and bismuth.

4. The process of claim 1, wherein, in addition to the at least one metal nitrate, the CED coating compositions contain at least one further metal compound other than the at least one metal nitrate, wherein the metals are present in these metal compounds with an oxidation number of +2 or above and not as a constituent of anions.

5. The process of claim 4, wherein the at least one further metal compound comprises a compound selected from the group consisting of compounds of vanadium, iron, zinc, yttrium, zirconium, tin, cerium, neodymium or bismuth.

6. The process of claim 5, wherein the total metal content arising from the contributions from metal nitrate and the at least one further metal compound amounts to 0.1 to 2 wt. % and wherein the sum of the contributions calculated as metal is in each case relative to the resin solids content of the CED coating composition.

7. The process of claim 4, wherein the total metal content arising from the contributions from metal nitrate and the at least one further metal compound amounts to 0.1 to 2 wt. % and wherein the sum of the contributions calculated as metal is in each case relative to the resin solids content of the CED coating composition.

8. The process of claim 1, wherein the substrates comprise automotive bodies or automotive body parts.

9. The process of claim 1, wherein at least one further coating layer is applied onto the baked CED coating layer.

* * * * *